United States Patent [19]

Katsuno et al.

[11] Patent Number: 5,708,788
[45] Date of Patent: Jan. 13, 1998

[54] METHOD FOR ADJUSTING FETCH PROGRAM COUNTER IN RESPONSE TO THE NUMBER OF INSTRUCTIONS FETCHED AND ISSUED

[75] Inventors: Akira Katsuno, Asao-Ku, Japan; Niteen A Patkar, Sunnyvale, Calif.; Sunil W. Savkar, New York, N.Y.; Michael C. Shebanow, Plano, Tex.

[73] Assignee: Fujitsu, LTD., Kanagawa-ken, Japan

[21] Appl. No.: 524,294

[22] Filed: Sep. 5, 1995

(Under 37 CFR 1.47)

Related U.S. Application Data

[63] Continuation of Ser. No. 398,066, Mar. 3, 1995, abandoned.
[51] Int. Cl.$^6$ .................. G06F 9/38; G06F 9/30
[52] U.S. Cl. ............................ 395/390; 395/561
[58] Field of Search ......................... 395/390, 561

[56] References Cited

U.S. PATENT DOCUMENTS

| | | | |
|---|---|---|---|
| 4,926,323 | 5/1990 | Baror et al. | 395/585 |
| 5,136,697 | 8/1992 | Johnson | 395/386 |
| 5,519,841 | 5/1996 | Sagar et al. | 395/412 |
| 5,564,118 | 10/1996 | Steely, Jr. et al. | 395/587 |
| 5,592,636 | 1/1997 | Popescu et al. | 395/586 |

*Primary Examiner*—Krisna Lim
*Attorney, Agent, or Firm*—Albert C. Smith, of Fenwick & West LLP

[57] ABSTRACT

A clocked instruction flow is managed subject to issue and fetch constraints through a plurality of instruction latches which receive instructions from selected memory locations. By checking the number of instructions fetched and issued, the fetch program counter is adjusted responsive to the status of selected state variables indicating instructions issued and fetched. The instruction latches are fully scheduled from cycle to cycle with instructions, by fetching instructions in accordance with a fetch program counter.

9 Claims, 7 Drawing Sheets

| PT_I_FT | PT_I_SD | PT_F_FT | F_D_B | I_BR | FPC_D |
|---|---|---|---|---|---|
| 0 | 0 | 0 | - | - | SEQUENTIAL PC |
| 0 | 0 | 1 | 1 | - | SEQUENTIAL PC |
| 0 | 0 | 1 | 0 | - | F_TARGET_FT |
| 0 | 1 | - | - | - | I_TARGET_SD |
| 1 | - | - | - | 0 | I_TARGET_FT |
| 1 | - | 0 | - | 1 | FPC_Q + FETCH_CNT |
| 1 | - | 1 | - | 1 | F_TARGET_FT |

| PT_I_FT | I_FT_DLY | PT_I_SD | I_SD_DLY | PT_F_FT | F_FT_DLY | F_D_B | F_DLY_B | I_BR_DLY | FPC_D |
|---|---|---|---|---|---|---|---|---|---|
| 0 | - | 0 | - | 0 | - | - | - | - | SEQUENTIAL PC |
| 0 | - | 0 | - | 1 | - | 1 | - | - | SEQUENTIAL PC |
| 0 | - | 0 | - | 1 | 1 | 0 | 1 | - | SEQUENTIAL PC |
| 0 | - | 0 | - | 1 | 1 | 0 | 0 | - | F_TARGET_FT |
| 0 | - | 0 | - | 1 | 0 | 0 | - | - | F_TARGET_FT |
| 0 | - | 1 | 1 | - | - | - | - | - | SEQUENTIAL PC |
| 0 | - | 1 | 0 | - | - | - | - | - | I_TARGET_SD |
| 1 | 1 | - | - | - | - | - | - | 0 | SEQUENTIAL PC |
| 1 | 0 | - | - | 0 | - | - | - | 1 | I_TARGET_FT |
| 1 | 0 | - | - | 1 | 1 | - | - | 1 | FPC_Q + FETCH_CNT |
| 1 | 0 | - | - | 1 | 0 | - | - | 1 | F_TARGET_FT |

METHOD FOR ADJUSTING FETCH PROGRAM COUNTER IN RESPONSE TO THE NUMBER OF INSTRUCTIONS FETCHED AND ISSUED

RELATED APPLICATIONS

This application is a continuation of U.S. patent application Ser. No. 398,066 filed Mar. 3, 1995 abandoned, having the same title and inventors as the present application.

The subject matter of this application is related to the subject matter of the following applications:

application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

application Ser. No. 08/517,229 filed on Aug. 21, 1995, which was a continuation of application Ser. No. 08/388,389, now abandoned entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/518,549 filed on Aug. 23, 1995, which was a continuation of application Ser. No. 08/388,606, now abandoned entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/516,230 filed on Aug. 17, 1995, which was a continuation of application Ser. No. 08/388,364, now abandoned entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/487,801 filed on Jun. 7, 1995, which was a continuation of application Ser. No. 08/398,299 filed on Mar. 3, 1995, now abandoned, which was a continuation of application Ser. No. 08/390,885, abandoned entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

aplication Ser. No. 08/772,835 filed on Dec. 24, 1996, which was a continuation of application Ser. No. 08/397,810, now abandoned entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen;

application Ser. No. 08/397,809, now allowed entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang;

application Ser. No. 08/522,567 filed on Sep. 1, 1995, now allowed, which was a continuation of application Ser. No. 08/397,383, now abandoned entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/523,384 filed on Sep. 5, 1995, which was a continuation of application Ser. No. 08/397,891, now allowed entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R.F.S. Szeto, Takumi Maruyama and DeForest W. Tovey;

application Ser. No. 08/397,911, now allowed entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/522,845 filed on Sep. 1, 1995, which was a continuation of application Ser. No. 08/398,284, now abandoned entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,284 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800, now allowed entitled "METHOD AND APPARATUS FOR GENERATING A ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu;

each of the above applications having the same assignee as the present invention, and each incorporated herein by reference in their entirety.

FIELD OF INVENTION

This invention relates to data processor design, and more specifically, to the design of a data processor with instruction fetch program counter control.

BACKGROUND OF THE INVENTION

Conventional data processors execute instructions from a program containing a sequence of instructions. Instruction flow proceeds in either a serial fashion, with consecutive memory addresses containing a sequence of instructions to issue and execute, or with control transfers which divide instruction flow to disjoint locations within the memory space. This results in the processing order of instructions to continue in a non-serial program sequence.

In modern data processors, the bandwidth of the instruction issue and execute hardware requires an ability to fetch multiple instructions beginning at a specified memory address within a single cycle of operation. A cycle of operation in a modern data processor indicates the time which it takes to do a defined, quantifiable update of machine state. Data processors must fetch instructions in advance of the issue related to the specified location in memory for the beginning of the instruction sequence for a specified cycle, in order to keep the issue and execution segments of the data processor occupied. The inability to supply instructions required for the issue and execution of the rest of the data processor penalizes overall efficiency of the machine, as the bandwidth of the data processor is not satisfied, and thus pieces of the machine which can do useful work become idle. The result of idle machine resources is lower overall performance with respect to optimal performance achievable by such data processors.

SUMMARY OF THE INVENTION

The present invention accordingly provides a fetch control method for efficiently organizing the inflow of instructions to the data processor in advance of the issue and execution of instructions based upon a given memory location, thereby avoiding gaps in instruction flow, and enhancing overall performance. In particular, the present invention includes a method for handling the evaluation of multiple and parallel locations at which a fetch program counter can operate and the updating of a fetch program counter based upon control signals available in the current cycle of operation.

According to the present invention, a fetch program counter (FPC) is updated in advancement of the current issue point relating to a location in memory in which instructions are stored. These locations may be in any memory system accessible by the data processor, including, for example, cache memory, dynamic random accessible memory or memory mapped input/output.

Instructions to be issued into a machine are stored in intermediate issue latches, located between the data path lines transporting instructions fetched from the memory locations pointed to by FPC, and the data path lines transporting instructions able to be issued within the current cycle as are stored in the issue latches. The issue latches are in fact clocked memory elements, able to be updated with new instruction data from the data path lines transporting instructions fetched. Upon determination by the issue logic of the data processor, the issue latch contents are forwarded to the rest of the machine, and the issue latch is flagged as available for update with new data arriving from the data path lines associated with the access of data pointed to by the FPC.

The current invention accordingly relies upon detection logic on the data path lines associated with instructions relating to the current memory location pointed to by FPC, detection logic relating to the validity of instructions within the issue latches, the number of instructions from the issue latches which are forwarded by the issue logic to the rest of the data processor, and the current memory location associated with the issue of instructions from the issue latches, to maintain control on the fetch program counter for accesses to the appropriate location within memory in the next cycle of the data processors' operation.

According to the present invention, instruction flow from a memory into a data processor is managed for issue subject to the constraints of fetching instructions from said memory, the storage of instructions from memory into the dataprocessor plurality of issue latches, and the constraints on the issue of instructions from the plurality of issue latches. The method includes, according to one embodiment, checking whether a taken control transfer instruction is stored in the plurality of issue latches for access by the issue control; check whether a taken control transfer instruction is fetched and driven on the datapath lines connected to the plurality of issue latches; and checking whether a fetched taken control transfer instruction is present.

DESCRIPTION OF THE PREFERRED EMBODIMENT

Figure 1:
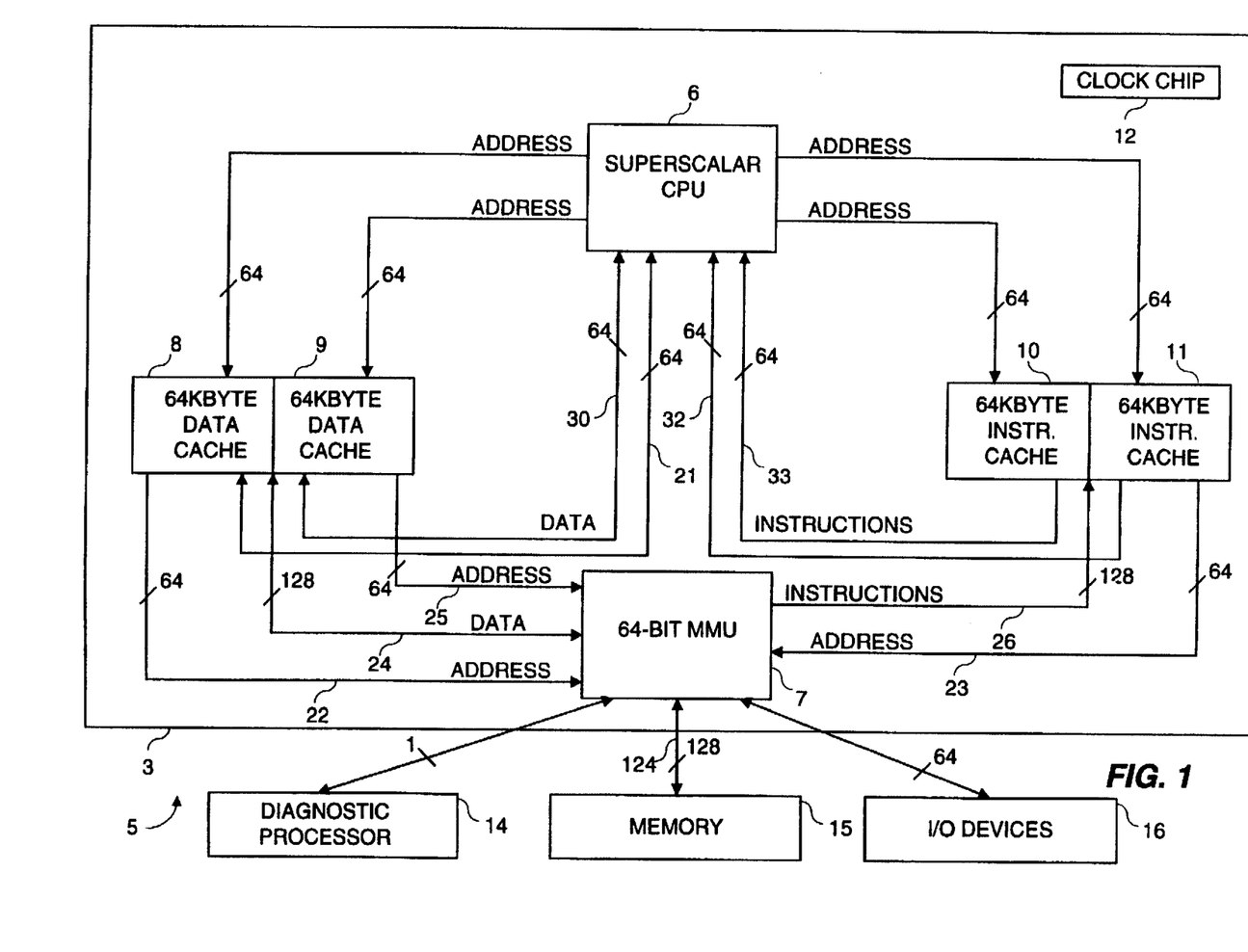
FIG. 1 is a diagram of a HaL R1 processor according to the present invention, implementing a SPARC V9 64-bit instruction set architecture.

FIG. 1 shows a HaL R1 processor 5 according to the present invention, implementing a SPARC V9 64-bit instruction set architecture. Processor 5 includes a superscalar central processing unit (CPU) 6, a memory management unit (MMU) 7, first through fourth cache chips respectively 8–11, and a clock chip 12. Processor 5 is mounted on a ceramic multi-chip module (MCM) 13 according to one embodiment of the present invention. Processor 5 further includes diagnostic processor 14, memory 15, and input output devices 16. Processor 5 uses methods according to the present invention including superscalar instruction issue, register renaming, and data flow execution with instruction-level parallelism. CPU 6 is connected to cache chips 8–11 with respective 64-bit lines 18–21. Cache chips 8 and 9 are data caches, and cache chips 10 and 11 are instruction caches. Address lines 22 and 23 respectively connect cache chips 8 and 11 to memory management unit 7. A 128-bit data line 24 connects cache chips 8 and 9 with memory management unit 7, and memory management unit 7 is in turn connected along an external 128-bit line 124 to memory 15, along a 1-bit line 125 to diagnostic processor 14, and along a 64-bit line to input output device(s) 16. Address line 25 connects cache chip 8 with memory management unit 7. Instruction line 26 connects memory management unit 7 with cache chips 10 and 11. 64-bit data lines 30 and 31 respectively connect CPU 6 with cache chips 8 and 9. 64-bit instruction lines 32 and 33 connect respective cache chips 10 and 11 with CPU 6. CPU instruction pipelining is implemented with processor 5. Pipelining is implemented in four stages for fixed-point instructions, and in six stages for load instructions. According to the present invention, out-of-order execution of instructions is implemented with three additional stages including deactivate, commit, and retire steps added to the steps of fetch, issue, addr gen, cache access, data return, and complete, in the case of a load instruction with a cache hit; and the steps of fetch, issue, execute, and complete, in the case of a fixed point instruction. An instruction is deactivated after it has been completed without error. An instruction is committed if it has been deactivated and all previous instructions have been deactivated. An instruction is retired when all machine recourses consumed by the instruction have been reclaimed. Prior to commit and retire stages, instructions may be undone by processor 5 due to execution errors and branch mispredicts. Processor 5 provides a precise state.

Figure 2:
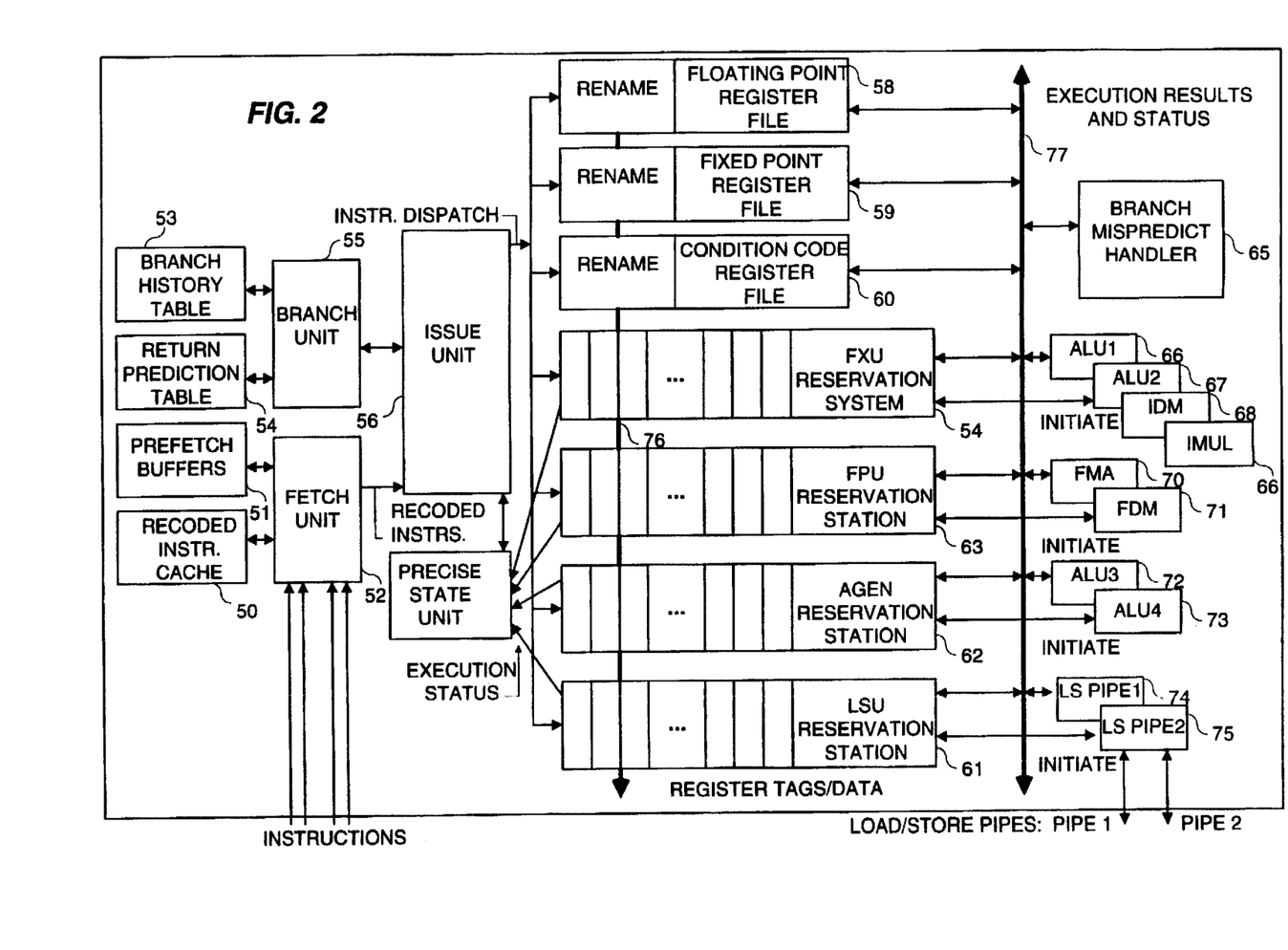
FIG. 2 is a block diagram of a central processing unit according to an embodiment of the present invention.

FIG. 2 is a block diagram of CPU 6 including a direct mapped or recorded instruction cache 50, prefetch buffers 51, a fetch unit 52, a branch history table 53, a return prediction table 54, a branch unit 55, an issue unit 56, a precise state unit 57, register units 58–60, reservation stations 61–64, branch mispredict handler 65, arithmetic logic units ALU1 66 and ALU2 67, DIV unit 68, MUL unit 69, FMA unit 70, FDIV unit 71, arithmetic logic units ALU3 72 and ALU4 73, LSPIPE1 74, LSPIPE2 75, and buses 76 and 77. Register units 58–60 each include a rename subunit and respectively floating point, fixed point, and condition code register file subunits, and reservation stations 61–64 are respectively a FXU reservation station, a floating point (FPU) reservation station, a AGEN reservation station, and an LSU reservation station. Prefetch buffers 51 and recorded instruction cache 50 are connected to fetch unit 52. Branch history table 53 and return prediction table 53 are connected to branch unit 55 which in turn is connected to fetch unit 52. Both branch unit 55 and fetch unit 52 are connected to issue unit 56, the fetch unit 52 providing recorded instructions to issue unit 56. Precise state unit 57 is connected to issue unit 56 and to reservation stations 61–64. Issue unit 56 is connected to register units 58–60 and to reservation stations 61–64, and register units 58–60 and to reservation stations 61–64 are connected to bus 76 for registration of tags and data and to bus 77 for execution results and status. Branch mispredict handler 65, arithmetic logic units ALU1 66 and ALU2 67, DIV unit 68, MUL unit 69, FMA unit 70, FDIV unit 71, arithmetic logic units ALU3 72 and ALU4 73, LSPIPE1 74, and LSPIPE2 75. During operation in accordance with one embodiment of the present invention, four instructions are fetched from recorded instruction cache 50 by fetch unit 52 and provided to issue unit 56. To improve cycle time, instructions in recorded instruction cache 50 have already been partially coded or recoded. Branch history table 53 includes according to one embodiment 1024 entries and includes 2-bit saturating counters, which are used to predict the direction of branches. In order to accelerate subrouting reruns that also contain indirect branch targets, a rerun prediction table is used to predict the return address.; Available machine resources and issue constraints are determined by issue unit 56. Up to four instructions are speculatively dispatched to four reservation stations 61–64. All instructions are issued in order. Generally, any combination of four fixed point, two floating point, two load store, or one branch instruction can be issued each cycle. Additionally, fixed point, floating point, and condition code registers are renamed in order to remove data hazards. Due to renaming of trap levels, traps detected during the issue stage can be entered speculatively. All dispatched instructions are assigned a unique 6-bit tag, resulting in a total of 64 outstanding instructions. In order to guarantee correctness, certain instructions such as branches are checkpointed by taking a snapshot of architectural state. A checkpoint can later be restored if a speculative instruction sequence is found to be issued or executed incorrectly due to a branch mispredict or an exception condition. Up to 16 checkpoints are available, allowing up to 16 levels of predicted branch instructions. Once dispatched, an instruction awaits selection for execution in one of four reservation stations. Selection is based solely on dataflow principles of operand availability. As a result, instructions may execute out of order and are self-scheduling. A total of seven instructions can be selected for execution each cycle. The fixed point, address generation, and load store reservation stations are each able to initiate two instructions for execution, while the floating point reservation station is able to initiate one instruction. The floating point execution units comprise a four cycle pipelined multiply add unit and a 60 ns self-timed floating point divider. The integer execution units include a 64b multiplier, a 64b divider, and four arithmetic logic units (ALU's). Not including effects due to pipelining, a peak of 10 instructions can be executed in parallel. Load store unit (LSU) 61 is able to send speculative loads to the cache. If possible, loads are allowed to bypass stores or earlier loads. According to an embodiment of the present invention, LSU 61 performs two independent 64b loads or stores each cycle. As instructions complete execution, results are broadcast to reservation stations and status information is provided to precise state unit (PSU) 57. Up to nine instructions can complete in a cycle. PSU 57 tracks errors and completion status, and commits and retires instructions in order. Up to eight instructions can be committed and four instructions retired each cycle. PSU 57 also sequences external interrupts and exceptions.

Figure 3A:
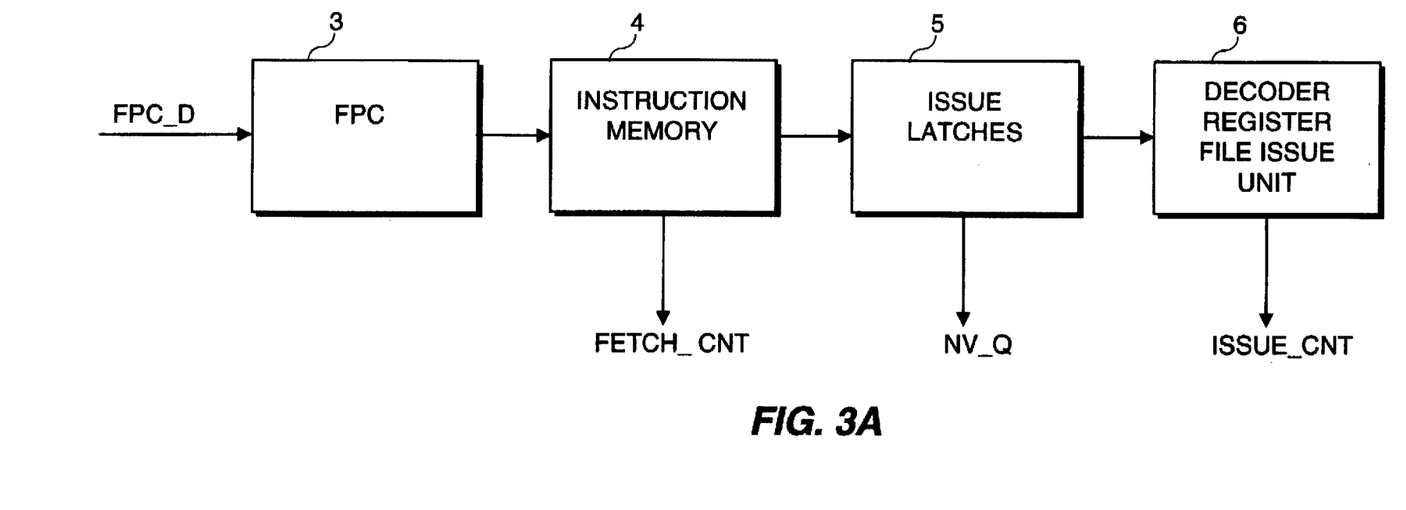
FIG. 3a is a block diagram of an embodiment of the present invention, including a fetch program counter, an instruction memory, a plurality of issue latches, and a decoder register file of the issue unit.

FIG. 3a is a block diagram of an embodiment of the present invention, including a fetch program counter 83, an instruction memory 84, a plurality of issue latches 85, and a decoder register file of the issue unit 86. Fetch program counter receives an input fetch program count indication FPC_D, and produces an output fetch program count, FPL_Q, indication which it provides as an input to instruction memory 84, according to the present invention. In turn, instruction memory 84 produces a count of instructions fetched, FETCH_CNT, as well as providing fetched instructions in accordance with the fetch program count to issue latches 85. Issue latches 85 in turn provide an indication of the number of valid instructions, NV_Q, in the issue latches 85, and further provide issued instructions to decoder register file issue unit 86. Decoder register file issue unit 86 provides a count of instructions issued, ISSUE_CNT. More particularly, EI=k means the number of issue latch entries (which according to one embodiment is four, i.e., 4), and NV_Q is the number of instructions in the issue latch which are valid, i.e., $0<=nv\_q<=k$, where k is the number of issue latch entries. Further, "PC_Q" means the current program counter (PC) value in the issue cycle; "FPC_Q" means the fetch program counter value (FPC) in the current cycle; "FETC_CNT" is the number of instructions which are fetched, i.e., $0<=\text{FETCH\_CNT}<=j$; "ISSUE_CNT" means the number of instructions which are issued, i.e., $0<=\text{issue\_cnt}<=\min\{i, NV\_Q\}$; and "NV_D" is the number of instructions which will be valid in the next cycle. According to one embodiment of the present invention, $NV\_D = \min\{EI, NV\_Q+\text{FETCH\_CNT}-\text{ISSUE\_CNT}\}$. At the start of each cycle, FPC_Q=PC_Q+NV_Q. Further, according to a straight-line embodiment of the present invention, FPC_D=PC_D+NV_D=PC_Q+ISSUE_CNT+min{EI, NV_Q+FETCH_CNT-ISSUE_CNT}= PC_Q+min{EI+ISSUE_CNT, NV_Q+FETCH_CNT}.

In particular, instruction memory in conjunction with the data path lines connecting instruction memory to the issue latches based upon the address pointed to by the current cycle FPC, drives fetched instructions upon said data path lines for the duration of the cycle, enabling the latch of said instruction data into the issue latches for use in the next cycle. In turn, detection logic, on the data path lines leading from the memory addressed by the fetch program counter and leading into the issue latches, produces a count of instructions currently fetched, FETCH_CNT. The issue latches, clocked memory elements able to gate instruction from the data path lines connecting to instruction memory based upon issue constraints, includes detection logic to produce an indication of the number of valid instructions currently in the issue latches, NV_Q, and further drives the datapath lines leading from the issue latches to the rest of the machine including the decoders for the register file, the execution units, and other internal datapath structures. Issue logic decoding said instructions driven by the issue latches upon the data path lines leading from the issue latches to the rest of the machine, provides feedback of the number of instructions which are issued in the current cycle.

The memory is attached to data path lines (i.e., wires) leading from memory to the issue latches, causing a drive (electrical constant drive over the duration of the cycle) of data on these lines, which may be latched (stored) in the issue latches, which themselves are driving wire (data path) connections between the issue latches and the rest of the internal data path of the data processor. In an embodiment of the present invention, it is the detection and computation logic connected to each of these pieces, the data path lines from the memory to the issue latches, the issue latches themselves, and the datapath lines from the issue latches to the rest of the machine, that provides the control signals used to modify the behavior of FPC.

Figure 3B:
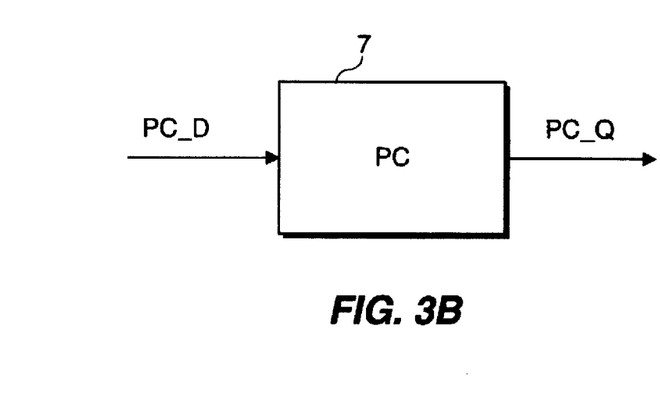
FIG. 3b is a representation of the program counter which clocks once per cycle.

FIG. 3b is a representation of the program counter 87 which clocks once per cycle, responding to an input program count signal, PC_D, with an output program count signal, PC_Q. The program count provides an indication of the architectural device operating in the current cycle. In particular, "PC_D" is the value of the next program count (PC); and "FPC_D" is the value of the next fetch program count (FPC).

Figure 4A:
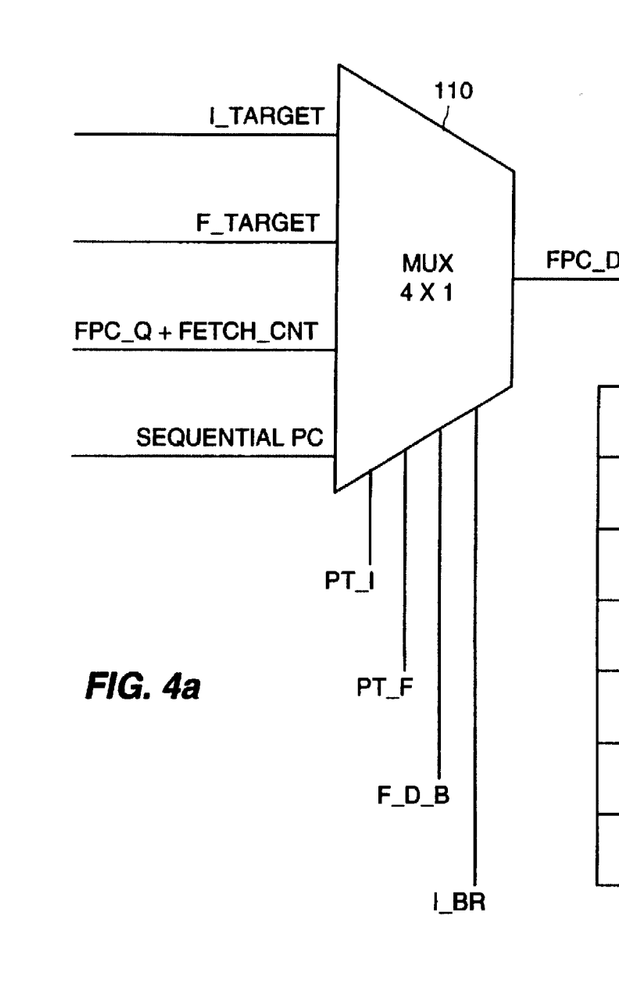
FIG. 4a is a multiplexer according to the present invention which produces an updated fetch program counter indication in response to predetermined taken control transfer instructions indicative of whether the issue or fetch cycles include a taken control transfer instruction, and whether a taken control transfer instruction will not be in the issue cycle or is issued in the present cycle.
Figure 4B:
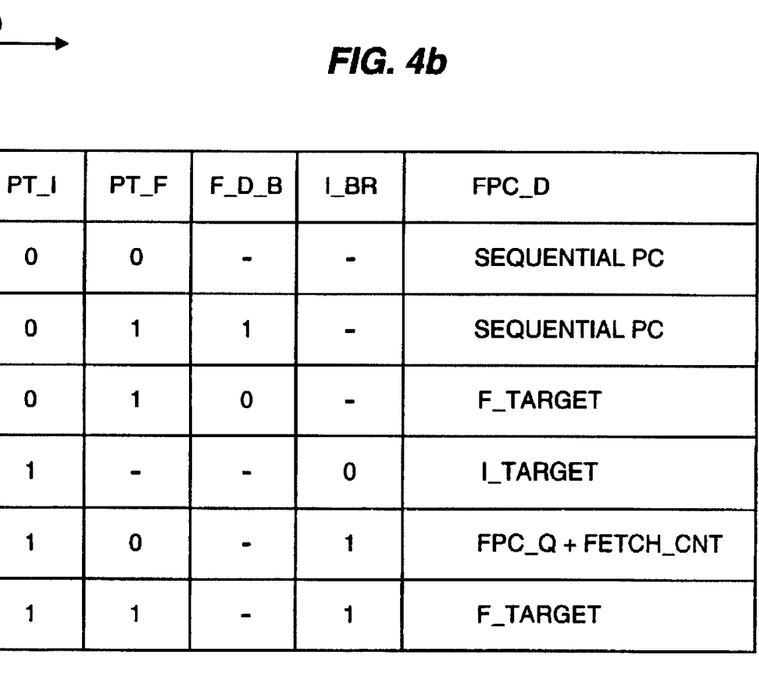
FIG. 4b is a control table according to the multiplexer of FIG. 4a, indicating updated fetch program counter indications produced in response to multiplexer inputs.

FIG. 4a shows a 4×1 multiplexer 110 which produces next FPC settings, FPC_D, equal to one of input values, I_TARGET, F_TARGET, FPC_Q+FETCH_CNT, and SEQUENTIAL PC, in accordace with the values set forth in FIG. 4b.

In particular, FPC_D means the next FPC; FPC_Q means the fetch PC in the current cycle; I_TARGET means the target PC of the first taken branch in the issue cycle; F_TARGET means the target PC of the first taken branch in the fetch cycle; FETCH_CNT means shows how may instructions are fetched; PT_I being '1' means that a predict taken branch is in the issue cycle; PT_F being '1' means that a predict taken branch is in the fetch cycle; F_D_B being '1' means that the predict taken branch in the fetch cycle will NOT be in the issue cycle; and I_BR being '1' means that the predict taken branch in the issue cycle is issued in this cycle.

Further, the next fetch program counter is set to the next program counter setting in order, if there is no predict taken branch in the issue cycle nor in the fetch cycle. The next fetch program counter is set to the next program counter setting in order, if there is no predict taken branch in the issue cycle, there is a predict taken branch in the fetch cycle, and there is a predict taken branch in the fetch cycle which will not be in the issue cycle. The next fetch program counter is set to the target program counter of the first taken branch in the fetch cycle, if there is no predict taken branch in the issue cycle, there is a predict taken branch in the fetch cycle, and there is a predict taken branch in the fetch cycle which will be in the issue cycle. The next fetch program counter is set to the target program counter of the first taken branch in the issue cycle, if there is a predict taken branch in the issue cycle, and there is a predict taken branch in the issue cycle which will not be issued in this cycle. The next fetch program counter to the current cycle fetch program count plus the fetch count, if there is a predict taken branch in the issue cycle but not in the fetch cycle, and there is a predict taken branch in the issue cycle which will be issued in this cycle. Finally, the next fetch program counter is set to the target program counter of the first taken branch in the fetch cycle, if there is a predict taken branch in the issue cycle and in the fetch cycle, and there is a predict taken branch in the issue cycle which will be issued in this cycle. Accordingly, under one embodiment of the present invention, issue latches 5 can issue up to one branch instruction in order to reduce logic and improve the timing of CPU operation.

Figure 5A:
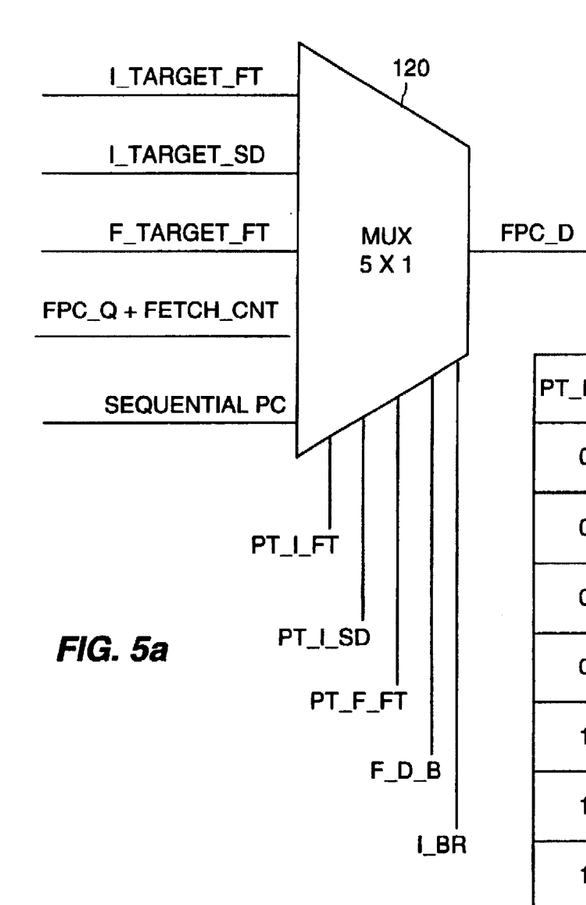
FIG. 5a is a multiplexer according to the present invention which produces an updated fetch program counter indication in response to predetermined taken control transfer instructions indicative of whether the issue or fetch cycles include a first or second taken control transfer instruction, and whether a taken control transfer instruction will not be in the issue cycle or is issued in the present cycle.
Figure 5B:
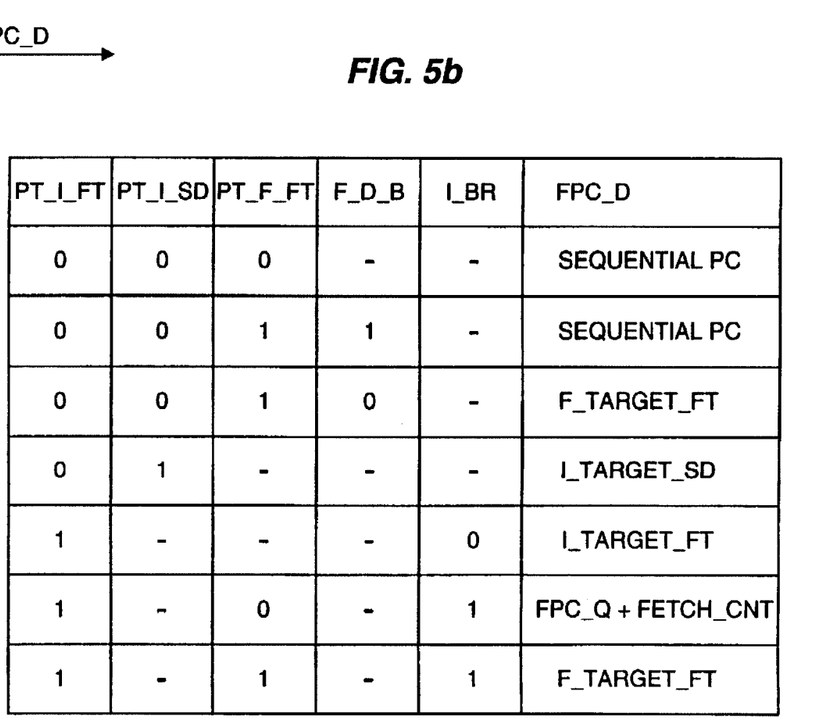
FIG. 5b is a control table according to the multiplexer of FIG. 5a, indicating updated fetch program counter indications produced in response to multiplexer inputs.

FIG. 5a shows a 4×1 multiplexer 120 which produces next FPC settings, FPC_D, equal to one of input values, I_TARGET_FT, I_TARGET_SD, F_TARGET_FT, FPC_Q+FETCH_CNT, and SEQUENTIAL PC, in accordance with the values set forth in FIG. 5b.

In particular, FPC_D means the next FPC; FPC_Q means the fetch PC in the current cycle; I_TARGET_FT means the target PC of the first taken branch in the issue cycle; I_TARGET_SD means the target PC of the second taken branch in the issue cycle; F_TARGET_FT means the target PC of the first taken branch in the fetch cycle; FETCH_CNT means shows how may instructions are fetched; PT_I_PT being '1' means that a first predict taken branch is in the issue cycle; PT_I_SD being '1' means that a second predict taken branch is in the issue cycle; PT_F_FT being '1' means that a first predict taken branch is in the fetch cycle; F_D_B being '1' means that the predict taken branch in the fetch cycle will NOT be in the issue cycle; and I_BR being '1' means that the predict taken branch in the issue cycle is issued in this cycle. By looking at the first and second branches in the issue cycle and the first branch in the fetch cycle, the FPC is updated based upon the following method.

The next fetch program counter is set to adjusting the fetch program counter in relationship to the number of issued instructions and the number of fetched instruction, if there are no taken control transfer instruction being fetched or latched for issue, and a taken control transfer instruction is fetched, or a fetched taken control transfer instruction is not latched for issue. The next fetch program counter is set to adjust the fetch program counter to the target program counter of the first taken branch in the fetch cycle, if there are no taken control transfer instruction being fetched or latched for issue, and a taken control transfer instruction is fetched, or a fetched taken control transfer instruction is latched for issue. The next fetch program counter is set to adjust the fetch program counter to the target program counter of the second taken branch in the issue cycle, if there are no first branch taken control transfer instruction being fetched but there is a second branch taken control transfer instruction being latched for issue. The next fetch program counter is set to adjust the fetch program counter to the target program counter of the first taken branch in the issue cycle, if there is a first taken control transfer instruction in the issue cycle, and the first branch in the issue cycle is not issued in the same cycle. The next fetch program counter is set to adjust the fetch program counter to the current cycle fetch program count plus the fetch count, if there is a taken control transfer instruction in the issue cycle but not in the fetch cycle, and a taken control transfer instruction which will be latched for issue. The next fetch program counter is set to adjust the fetch program counter to the target program counter of the first taken branch in the fetch cycle, if there is a taken control transfer instruction in the issue cycle and in the fetch cycle, and there is a taken control transfer instruction in the issue cycle which will be latched for issue in this cycle.

Figure 6A:
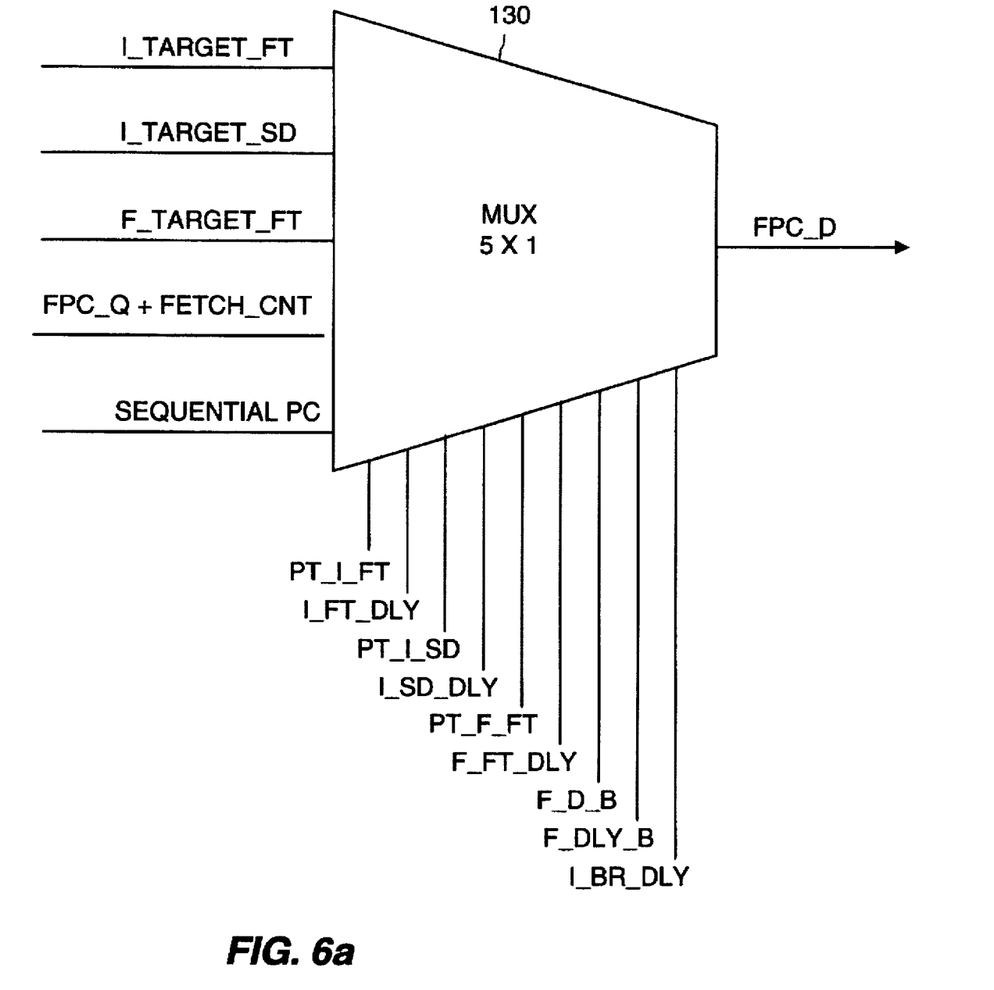
FIG. 6a is a multiplexer according to the present invention which produces an updated fetch program counter indication in response to predetermined taken control transfer instructions indicative of whether non-annulled issue or fetch cycles include a first or second taken control transfer instruction, and whether a non-annulled taken control transfer instruction will not be in the issue cycle or is issued in the present cycle.
Figure 6B:
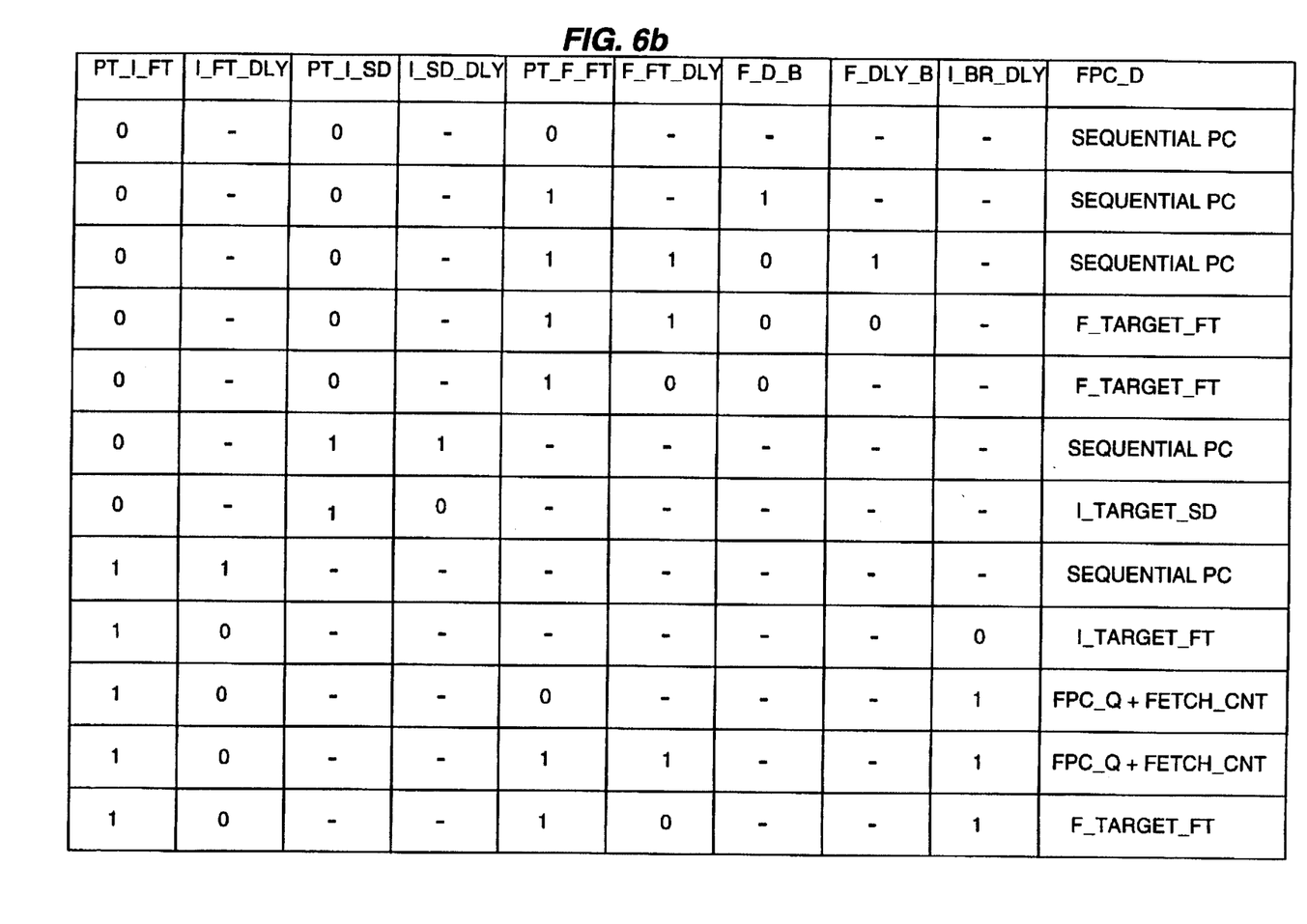
FIG. 6b is a control table according to the multiplexer of FIG. 6a, indicating updated fetch program counter indications produced in response to multiplexer inputs.

FIG. 6a shows a 4×1 multiplexer 20 which produces next FPC settings, FPC_D, equal to one of input values, I_TARGET_FT, I_TARGET_SD, F_TARGET_FT, FPC_Q+FETCH_CNT, and SEQUENTIAL PC, in accordance with the values set forth in FIG. 6b.

In particular, FPC_D means the next FPC; FPC_Q means the fetch PC in the current cycle; I_TARGET_FT means the target PC of the first taken branch in the issue cycle; I_TARGET_SD means the target PC of the second taken branch in the issue cycle; F_TARGET_FT means the target PC of the first taken branch in the fetch cycle; FETCH_CNT means shows how may instructions are fetched; PT_I_FT being '1' means that a first predict taken branch is in the issue cycle; PT_I_SD being '1' means that a second predict taken branch is in the issue cycle; PT_F_FT being '1' means that a first predict taken branch is in the fetch cycle; F_D_B being '1' means that the predict taken branch in the fetch cycle will NOT be in the issue cycle; I_BR being '1' means that the predict taken branch in the issue cycle is issued in this cycle; I_FT_DLY being '1' means that the first branch in the issue cycle has a delay instruction which is not annulled and the delay instruction will NOT be in the issue cycle; PT_I_SD being '1' means that the second branch in the issue cycle is predicted taken; I_SD_DLY being '1' means that the second branch in the issue cycle has a delay instruction which is not annulled and the delay instruction will NOT be in the issue cycle; F_FT_DELAY being '1' means that the first branch in the fetch cycle has a delay instruction which is not annulled and the delay instruction is NOT in the fetch cycle; F_DLY_B means '1' means that the first branch in the fetch cycle has a delay instruction which is not annulled and the delay instruction will NOT be in the issue cycle; I_BR means '1' means that the first branch without a delay instruction in the issue cycle is issued in this cycle or both the first branch and the delay instruction which is not annulled are issued in this cycle.

According to another embodiment of the present invention which is applicable to an instruction set architecture, i.e., SPARC, which has a delay instruction and an annul bit, consideration is made whether the delay instruction is issued or not, if the delay will be in the issue latches, or not, and whether the delay in the fetch cycle has already been fetched or not, among other considerations, in which case, the FPC is updated according to the following method. In particular, the next fetch program counter is set to adjust the fetch program counter in relationship to the number of issued instructions and the number of fetched instruction, if there is no first taken control transfer instruction latched for issue, there is no second taken control transfer instruction latched for issue, and no second taken control transfer instruction is fetched. The next fetch program counter is set to adjust the fetch program counter in relationship to the number of issued instructions and the number of fetched instruction, if there is no first taken control transfer instruction latched for issue, there is no second taken control transfer instruction latched for issue, a second taken control transfer instruction is fetched, and the first control transfer function fetched will not latch to issue. The next fetch program counter is set to adjust the fetch program counter in relationship to the number of issued instructions and the number of fetched instruction, if there is no first taken control transfer instruction latched for issue, there is no second taken control transfer instruction latched for issue, a second taken control transfer instruction is fetched, a first fetched control transfer instruction includes a non-annulled delay instruction not in a fetch cycle, the first control transfer function fetched will latch to issue, and a first fetched control transfer instruction includes a non-annulled delay instruction not in an issue cycle. The next fetch program counter is set to adjust the fetch program counter to the target program counter of the first taken branch in the fetch cycle, if there is no first taken control transfer instruction latched for issue, there is no second taken control transfer instruction latched for issue, a second taken control transfer instruction is fetched, a first fetched control transfer instruction includes a non-annulled delay instruction not in a fetch cycle, the first control transfer function fetched will latch to issue, and a first fetched control transfer instruction includes a non-annulled delay instruction not in an issue cycle. The next fetch program counter is set to adjust the fetch program counter to the target program counter of the first taken branch in the fetch cycle, if there is no first taken control transfer instruction latched for issue, there is no second taken control transfer instruction latched for issue, a second taken control transfer instruction is fetched, and a first fetched control transfer instruction does not include a non-annulled delay instruction not in a fetch cycle. The next fetch program counter is set to adjust the fetch program counter in relationship to the number of issued instructions and the number of fetched instruction, if there is no first taken control transfer instruction latched for issue, there is a second taken control transfer instruction latched for issue, and a second control transfer instruction latched for issue includes a non-annulled delay instruction which will not be issued. The next fetch program counter is set to adjust the fetch program counter to the target program counter of the second taken branch in the issue cycle, if there is no first taken control transfer instruction latched for issue, there is a second taken control transfer instruction latched for issue, and a second control transfer instruction latched for issue does not include a non-annulled delay instruction which will not be issued. The next fetch program counter is set to adjust the fetch program counter in relationship to the number of issued instructions and the number of fetched instruction, if there is a first taken control transfer instruction latched for issue, a first control transfer instruction latched for issue includes a non-annulled delay instruction not latched for issue, or a fetched taken control transfer instruction is not latched for issue. The next fetch program counter is set to adjust the fetch program counter to the target program counter of the first taken branch in the issue cycle, if there is a first taken control transfer instruction latched for issue, a first control transfer instruction latched for issue does not include a non-annulled delay instruction not latched for issue, or a fetched taken control transfer instruction is not latched for issue, and a first control transfer instruction without a delay instruction in the issue cycle is issued in its current cycle or both the first control transfer instruction and the delay instruction which is not annulled, are issued. The next fetch program counter is set to adjust the fetch program counter to the current cycle fetch program count plus the fetch count, if there is a first taken control transfer instruction latched for issue, a first control transfer instruction latched for issue does not include a non-annulled delay instruction not latched for issue, no second taken control transfer instruction is fetched, and a first control transfer instruction without a delay instruction in the issue cycle is issued in its current cycle or both the first control transfer instruction and the delay instruction which is not annulled, are issued. The next fetch program counter is set to adjust the fetch program counter to the current cycle fetch program count plus the fetch count, if there is a first taken control transfer instruction latched for issue, a first control transfer instruction latched for issue does not include a non-annulled delay instruction not latched for issue, a second taken control transfer instruction is fetched, a first fetched control transfer instruction includes a non-annulled delay instruction in a fetch cycle, and a first control transfer instruction without a delay instruction in the issue cycle is issued in its current cycle or both the first control transfer instruction and the delay instruction which is not annulled, are issued. The next fetch program counter is set to adjust the fetch program counter to the target program counter of the first taken branch in the fetch cycle, if there is a first taken control transfer instruction latched for issue, a first control transfer instruction latched for issue does not include a non-annulled delay instruction not latched for issue, a second taken control transfer instruction is fetched, a first fetched control transfer instruction includes a non-annulled delay instruction not in a fetch cycle; and a first control transfer instruction without a delay instruction in the issue cycle is issued in its current cycle or both the first control transfer instruction and the delay instruction which is not annulled, are issued.

Below are selected examples of the method of the present invention, for a 4 instruction-wide superscalar processor according to the relationship (i,j,k)=(4, 4, 4), assuming the following instruction code:

PC Instruction

In these examples, Sx indicates a non-control transfer instruction; Bx indicates a branch instruction; Dx indicates a branch delay instruction; and Tx indicates a target instruction, if a branch predicted is taken. The case numbers indicated, refer to the examples set forth in FIG. 6b.

(Example .1 of case .0)
FPC_Q: 14, Instructions in FETCH: D0, B1, D1, S3
PC_Q: 10, Instructions in ISSUE: S0, S1, S2, B0

We assume that B0 and B1 are predicted not_taken.
If S0 and S1 are issued, then FPC_D=16<—sequential PC.
In the next cycle,
FPC_Q: 16, Insts in FETCH: D1, S3, B2, D2
PC_Q: 12, Insts in ISSUE: S2, B0, D0, B1

(Example .2 of case .0)
FPC_Q: 17, Insts in FETCH: S3, B2, D2, S4
PC_Q: 13, Insts in ISSUE: B0, D0, B1, D1
We assume that B0 and B1, B2 are predicted not_taken.
If B0 and D0 are issued, then FPC_D=19<—sequential PC.
In the next cycle,
FPC_Q: 19, Insts in FETCH: D2, S4, S5, S6PC_Q: 15, Insts in ISSUE: B1, D1, S3, B2

(Example of case .1)
FPC_Q: 17, Insts in FETCH: S3, B2, D2, S4
PC_Q: 13, Insts in ISSUE: B0, D0, B1, D1
We assume that B0 and B1 are predicted not_taken but B2 is predicted taken.
If B0 is issued and D0 is not annulled, f_d_b=1, then FPC_D=18<—sequential PC.
In the next cycle,
FPC_Q: 18, Insts in FETCH: B2, D2, S4, S5
PC_Q: 14, Insts in ISSUE: D0, B1, D1, S3

(Example of case .2)
FPC_Q: 17, Insts in FETCH: S3, B2, D2, S4
PC_Q: 13, Insts in ISSUE: B0, D0, B1, D1
We assume that B0 and B1 are predicted not_taken but B2 is predicated taken.
If B0 and D0 are issued and D2 is not annulled, f_ft_dly=1, f_d_b=0 and f_dly_b=1, then FPC_D=19<—sequential PC.
In the next cycle,
FPC_Q: 19, Insts in FETCH: D2, S4, S5, S6
PC_Q: 15, Insts in ISSUE: B1, D1, S3, B2

(Example of case .3)
FPC_Q: 15, Insts in FETCH: B1, D1, S3, B2
PC_Q: 11, Insts in ISSUE: S1, S2, B0, D0
We assume that B0 are predicted not_taken but B1 is predicated taken.
If S1 and S2 are issued and D0 is not annulled, f_ft_dly=1, f_d_b=0 and f_dly_b=0, then FPC_D=40<—f_target_ft
In the next cycle,
FPC_Q: 40, Insts in FETCH: T10, B10, D10, T11
PC_Q: 13, Insts in ISSUE: B0, D0, B1, D1

(Example of case .4)
FPC_Q: 17, Insts in FETCH: S3, B2, D2, S4
PC_Q: 13, Insts in ISSUE: B0, D0, B1, D1
We assume that B0 and B1 are predicted not_taken but B2 is predicated taken.
If B0 and D0 are issued and D2 is not annulled, f_ft_dly=0 and f_d_b=0, then FPC_D=50<—f_target_ft
In the next cycle,
FPC_Q: 50, Insts in FETCH: T20, B20, D20, T21
PC_Q: 15, Insts in ISSUE: B1, D1, S3, B2

(Example of case .5)
FPC_Q: 16, Insts in FETCH: -, -, -, (No valid instruction)
PC_Q: 12, Insts in ISSUE: S2, B0, D0, B1
We assume that B0 are predicted not_taken but B1 is predicated taken.
If S2, B0 and D0 are issued and D1 is not annulled, i_sdt_dly=1, then FPC_D=16<—sequential PC.
In the next cycle,
FPC_Q: 16, Insts in FETCH: D1, S3, B2, D2
PC_Q: 15, Insts in ISSUE: B1, -, -, -

(Example of case .6)

FPC_Q: 16, Insts in FETCH: D1, S3, B2, D2
PC_Q: 12, Insts in ISSUE: S2, B0, D0, B1
We assume that B0 are predicted not_taken but B1 is predicated taken.
If S2, B0 and D0 are issued and D1 is not annulled, i_sd_dly=0, then FPC_D=40<—i_target_sd
In the next cycle,
FPC_Q: 40, Insts in FETCH: T10, B10, D10, T11
PC_Q: 15, Insts in ISSUE: B1, D1, S3, B2
(Example of case .7)
FPC_Q: 14, Insts in FETCH: -, -, -, -
PC_Q: 10, Insts in ISSUE: S0, S1, S2, B0
We assume that B0 are predicted taken.
If S0, S1 and S2 are issued and D0 is not annulled, i_ft_dly=1, then FPC_D=14<—sequential PC
In the next cycle,
FPC_Q: 14, Insts in FETCH: D0, B1, D1, S3
PC_Q: 13, Insts in ISSUE: B0, -, -, -
(Example of case .8)
FPC_Q: 30, Insts in FETCH: T00, T01, B00, D00
PC_Q: 12, Insts in ISSUE: S2, B0, D0, B1
We assume that B0 is predicted taken.
If S2 and B0 are issued and D0is not annulled, i_ft_dly=0 and i_br_dly=0, then FPC_D=30<—i_target_ft
In the next cycle,
FPC_Q: 30, Insts in FETCH: T00, T01, B00, D00
PC_Q: 14, Insts in ISSUE: D0, D1, -, -
(Example of case .9)
FPC_Q: 30, Insts in FETCH: T00, T01, B00, D00
PC_Q: 12, Insts in ISSUE: S2, B0, D0, B1
We assume that B0 is predicted taken but B00 is predicated not_taken.
If S2, B0 and D0 are issued, i_ft_dly=0 and i_br_dly=1, then FPC_D=34<—FPC_Q+fetch_cnt
In the next cycle,
FPC_Q: 34, Insts in FETCH: T02, T03, T04, T05
PC_Q: 30, Insts in ISSUE: T00, T01, B00, D00
(Example of case .10)
FPC_Q: 30, Insts in FETCH: T00, T01, B00, -
PC_Q: 12, Insts in ISSUE: S2, B0, D0, B1
We assume that B0 is predicted taken and B00 is predicated taken.
If S2, B0 and D0 are issued and D00 is not annulled, i_ft_dly=0, f_ft_dly=1 and i_br_dly=1, then FPC_D=33<—FPC_Q+fetch_cnt
In the next cycle,
FPC_Q: 33, Insts in FETCH: D00, T02, T03, T04
PC_Q: 30, Insts in ISSUE: T00, T01, B00, -
(Example of case .11)
FPC_Q: 30, Insts in FETCH: T00, T01, B00, D00
PC_Q: 12, Insts in ISSUE: S2, B0, D0, B1
We assume that B0 are predicted taken but B00 is predicated taken.
If S2, B0 and D0 are issued and D00 is not annulled, i_ft_dly=0, f_ft_dly=0 and i_br_dly=1, then FPC_D=60<—f_target_ft
In the next cycle,
FPC_Q: 60, Insts in FETCH: T30, T31, B30, D30
PC_Q: 30, Insts in ISSUE: T00, T01, B00, D00

What is claimed is:

1. A method of managing a clocked instruction flow subject to issue and fetch constraints in plurality of instruction latches which receive instructions, including, from selected memory locations, said method comprising the steps of:

checking whether a taken control transfer instruction is latched for issue;

checking whether a taken control transfer instruction is fetched;

checking whether a fetched taken control transfer instruction will not be in the next issue cycle;

checking whether a taken control transfer instruction is latched for issue in the current cycle;

determining the number of instructions fetched and the number of instructions issued in the current cycle;

adjusting the fetch program counter in relationship to the number of issued instructions and the number of fetched instructions, if there is no taken control transfer instruction being fetched or latched for issue;

adjusting the fetch program counter in relationship to the number of issued instructions and the number of fetched instructions, if no taken control transfer instruction is latched for issue, and a taken control transfer instruction is fetched, or a fetched taken control transfer instruction is not latched for issue;

adjusting the fetch program counter to the target program counter of the first taken branch in the fetch cycle, if there is no taken control transfer instruction in the issue cycle, there is a predict taken branch in the fetch cycle, and there is a predict taken branch in the fetch cycle which will be loaded for issue;

adjusting the fetch program counter to the target program counter of the first taken branch in the issue cycle, if there is a taken control transfer instruction in the issue cycle, and there is a predict taken branch latched for issue which will not be issued in this cycle;

adjusting the fetch program counter to the current cycle fetch program count plus the fetch count, if there is a taken control transfer instruction in the issue cycle but not in the fetch cycle, and a taken control transfer instruction which will be latched for issue; and adjusting the fetch program counter to the target program counter of the first taken branch in the fetch cycle, if there is a taken control transfer instruction in the issue cycle and in the fetch cycle, and there is a taken control transfer instruction in the issue cycle which will be latched for issue in this cycle.

2. The method according to claim 1 wherein the fetch program counter is adjusted according to the relationship:

FPC_D=PC_Q+ISSUE_CNT+min{EI, [NC_Q] NV_Q+FETCH_CNT−ISSUE_CNT}, where: EI=k means the number of issue latch entries, and NV_Q is the number of instructions in the issue latch which are valid, i.e., 0<=nv_q<=k, where k is the number of a particular issue latch entry, wherein, "PC_Q" means the current program counter (PC) value in the issue cycle; "FPC_Q" means the fetch program counter value (FPC) in the current cycle; "FETCH_CNT" is the number of instructions which are fetched, i.e., 0<=FETCH_CNT<=j; "ISSUE_CNT" means the number of instructions which are issued, i.e., 0<=issue_cnt<=min{i, NV_Q}; and "NV_D" is the number of instructions which will be valid in the next cycle.

3. The method according to claim 1 wherein the fetch program counter is adjusted according to the relationship:

FPC_D=PC_Q+min{EI+ISSUE_CNT, [NV+Q]NV_Q+FETCH_CNT}, where: EI=k means the number of issue latch entries, and NV_Q is the number of instructions in the issue latch which are valid, i.e., 0<=nv_q<=k, where k is the number of issue latch entries, wherein, "PC_Q" means the current program counter (PC) value in the issue cycle; "FPC_Q" means the fetch program counter value (FPC) in the current cycle; "FETCH_CNT" is the number of instructions which are fetched, i.e., 0<=FETCH_CNT<=j; "ISSUE_CNT" means the number of instructions which are issued, i.e., 0<=issue_cnt<=min{i, NV_Q}; and "NV_D" is the number of instructions which will be valid in the next cycle.

4. A method of managing a clocked instruction flow subject to issue and fetch constraints in plurality of instruction latches which receive instructions, including, from selected memory locations, said method comprising the steps of:

checking whether a taken control transfer instruction is latched for issue;

checking whether a taken control transfer instruction is fetched;

checking whether a fetched taken control transfer instruction will not be in the next issue cycle;

checking whether a taken control transfer instruction is latched for issue in the current cycle;

determining the number of instructions fetched and the number of instructions issued in the current cycle;

adjusting the fetch program counter in relationship to the number of issued instructions and the number of fetched instructions, if there are no taken control transfer instructions being fetched or latched for issue, and a taken control transfer instruction is fetched, or a fetched taken control transfer instruction is not latched for issue;

adjusting the fetch program counter to the target program counter of the first taken branch in the fetch cycle, if there are no taken control transfer instruction being fetched or latched for issue, and a taken control transfer instruction is fetched, or a fetched taken control transfer instruction is latched for issue;

adjusting the fetch program counter to the target program counter of the second taken branch in the issue cycle, if there are no first branch taken control transfer instruction being fetched but there is a second branch taken control transfer instruction being latched for issue;

adjusting the fetch program counter to the target program counter of the first taken branch in the issue cycle, if there is a first taken control transfer instruction in the issue cycle, and the first branch in the issue cycle is not issued in the same cycle;

adjusting the fetch program counter to the current cycle fetch program count plus the fetch count, if there is a taken control transfer instruction in the issue cycle but not in the fetch cycle, and a taken control transfer instruction which will be latched for issue; and adjusting the fetch program counter to the target program counter of the first taken branch in the fetch cycle, if there is a taken control transfer instruction in the issue cycle and in the fetch cycle, and there is a taken control transfer instruction in the issue cycle which will be latched for issue in this cycle.

5. The method according to claim 4 wherein the fetch program counter is adjusted according to the relationship:

FPC_D=PC_ISSUE_CNT+min{EI, [NC_Q]NV_Q+FETCH_CN−ISSUE_CNT}, where: EI=k means the number of issue latch entries, and NV_Q is the number of instructions in the issue latch which are valid, i.e., 0<=nv_q<=k, where k is the number of issue latch entries, wherein, "PC_Q" means the current program counter (PC) value in the issue cycle; "FPC_Q" means the fetch program counter value (FPC) in the current cycle; "FETCH_CNT" is the number of instructions which are fetched, i.e., 0<=FETCH_CNT<=j; "ISSUE_CNT" means the number of instructions which are issued, i.e., 0<=issue_cnt<=min{i, NV_Q}; and "NV_D" is the number of instructions which will be valid in the next cycle.

6. The method according to claim 3 wherein the fetch program counter is adjusted according to the relationship:

FPC_D=PC_Q+min{EI+ISSUE_CNT, [NV+Q]NV_Q+FETCH_CNT}, where: EI=k means the number of issue latch entries, and NV_Q is the number of instructions in the issue latch which are valid, i.e., 0<=nv_q<=k, where k is the number of issue latch entries, wherein, "PC_Q" means the current program counter (PC) value in the issue cycle; "FPC_Q" means the fetch program counter value (FPC) in the current cycle; "FETCH_CNT" is the number of instructions which are fetched, i.e., 0<=FETCH_CNT<=j; "ISSUE_CNT" means the number of instructions which are issued, i.e., 0<=issue_cnt<=min{i, NV_Q}; and "NV_D" is the number of instructions which will be valid in the next cycle.

7. A method of managing a clocked instruction flow subject to issue and fetch constraints in plurality of instruction latches which receive instructions, including, from selected memory locations, said method comprising the steps of:

checking whether a taken control transfer instruction is latched for issue;

checking whether a taken control transfer instruction is fetched;

checking whether a fetched taken control transfer instruction will not be in the next issue cycle;

checking whether a taken control transfer instruction is latched for issue in the current cycle;

determining the number of instructions fetched and the number of instructions issued in the current cycle;

adjusting the fetch program counter in relationship to the number of issued instructions and the number of fetched instruction, if there is no first taken control transfer instruction latched for issue, there is no second taken control transfer instruction latched for issue, and no second taken control transfer instruction is fetched;

adjusting the fetch program counter in relationship to the number of issued instructions and the number of fetched instruction, if there is no first taken control transfer instruction latched for issue, there is no second taken control transfer instruction latched for issue, a second taken control transfer instruction is fetched, and the first control transfer function fetched will not latch to issue;

adjusting the fetch program counter in relationship to the number of issued instructions and the number of fetched instruction, if there is no first taken control transfer instruction latched for issue, there is no second taken control transfer instruction latched for issue, a second taken control transfer instruction is fetched, a first fetched control transfer instruction includes a non-annulled delay instruction not in a fetch cycle, the first control transfer function fetched will latch to issue, and a first fetched control transfer instruction includes a non-annulled delay instruction not in an issue cycle;

adjusting the fetch program counter to the target program counter of the first taken branch in the fetch cycle, if there is no first taken control transfer instruction latched for issue, there is no second taken control transfer instruction latched for issue, a second taken control transfer instruction is fetched, a first fetched control transfer instruction includes a non-annulled delay instruction not in a fetch cycle, the first control transfer function fetched will latch to issue, and a first fetched control transfer instruction includes a non-annulled delay instruction not in an issue cycle;

adjusting the fetch program counter to the target program counter of the first taken branch in the fetch cycle, if there is no first taken control transfer instruction latched for issue, there is no second taken control transfer instruction latched for issue, a second taken control transfer instruction is fetched, and a first fetched control transfer instruction does not include a non-annulled delay instruction not in a fetch cycle;

adjusting the fetch program counter in relationship to the number of issued instructions and the number of fetched instruction, if there is no first taken control transfer instruction latched for issue, there is a second taken control transfer instruction latched for issue, and a second control transfer instruction latched for issue includes a non-annulled delay instruction which will not be issued;

adjusting the fetch program counter to the target program counter of the second taken branch in the issue cycle, if there is no first taken control transfer instruction latched for issue, there is a second taken control transfer instruction latched for issue, and a second control transfer instruction latched for issue does not include a non-annulled delay instruction which will not be issued;

adjusting the fetch program counter in relationship to the number of issued instructions and the number of fetched instruction, if there is a first taken control transfer instruction latched for issue, a first control transfer instruction latched for issue includes a non-annulled delay instruction not latched for issue, or a fetched taken control transfer instruction is not latched for issue;

adjusting the fetch program counter to the target program counter of the first taken branch in the issue cycle, if there is a first taken control transfer instruction latched for issue, a first control transfer instruction latched for issue does not include a non-annulled delay instruction not latched for issue, or a fetched taken control transfer instruction is not latched for issue, and a first control transfer instruction without a delay instruction in the issue cycle is issued in its current cycle or both the first control transfer instruction and the delay instruction which is not annulled, are issued;

adjusting the fetch program counter to the current cycle fetch program count plus the fetch count, if there is a first taken control transfer instruction latched for issue, a first control transfer instruction latched for issue does not include a non-annulled delay instruction not latched for issue, no second taken control transfer instruction is fetched, and a first control transfer instruction without a delay instruction in the issue cycle is issued in its current cycle or both the first control transfer instruction and the delay instruction which is not annulled, are issued;

adjusting the fetch program counter to the current cycle fetch program count plus the fetch count, if there is a first taken control transfer instruction latched for issue, a first control transfer instruction latched for issue does not include a non-annulled delay instruction not latched for issue, a second taken control transfer instruction is fetched, a first fetched control transfer instruction includes a non-annulled delay instruction in a fetch cycle, and a first control transfer instruction without a delay instruction in the issue cycle is issued in its current cycle or both the first control transfer instruction and the delay instruction which is not annulled, are issued; and adjusting the fetch program counter to the target program counter of the first taken branch in the fetch cycle, if there is a first taken control transfer instruction latched for issue, a first control transfer instruction latched for issue does not include a non-annulled delay instruction not latched for issue, a second taken control transfer instruction is fetched, a first fetched control transfer instruction includes a non-annulled delay instruction not in a fetch cycle; and a first control transfer instruction without a delay instruction in the issue cycle is issued in its current cycle or both the first control transfer instruction and the delay instruction which is not annulled, are issued.

8. The method according to claim 7 wherein the fetch program counter is adjusted according to the relationship:

FPC_D=PC_Q+ISSUE_CNT+min{EI, [NC_Q]NV_Q+FETCH_CN−ISSUE_CNT}, where: EI=k means the number of issue latch entries, and NV_Q is the number of instructions in the issue latch which are valid, i.e., $0<=nv\_q<=k$, where k is the number of issue latch entries, wherein, "PC_Q" means the current program counter (PC) value in the issue cycle; "FPC_Q" means the fetch program counter value (FPC) in the current cycle; "FETCH_CNT" is the number of instructions which are fetched, i.e., $0<=FETCH\_CNT<=j$; "ISSUE_CNT" means the number of instructions which are issued, i.e., $0<=issue\_cnt<=min\{i, NV\_Q\}$; and "NV_D" is the number of instructions which will be valid in the next cycle.

9. The method according to claim 7 wherein the fetch program counter is adjusted according to the relationship:

FPC_D=PC_Q+min{EI+ISSUE_CNT, [NV+Q]NV_Q+FETCH_CNT}, where: EI=k means the number of issue latch entries, and NV_Q is the number of instructions in the issue latch which are valid, i.e., $0<=nv\_q<=k$, where k is the number of a particular issue latch entry, wherein, "PC_Q" means the current program counter (PC) value in the issue cycle; "FPC_Q" means the fetch program counter value (FPC) in the current cycle; "FETCH_CNT" is the number of instructions which are fetched, i.e., $0<=FETCH\_CNT<=j$; "ISSUE_CNT" means the number of instructions which are issued, i.e., $0<=issue\_cnt<=min\{i, NV\_Q\}$; and "NV_D" is the number of instructions which will be valid in the next cycle.

* * * * *